United States Patent
Daneshpanah et al.

(10) Patent No.: US 9,311,700 B2
(45) Date of Patent: Apr. 12, 2016

(54) MODEL-BASED REGISTRATION AND CRITICAL DIMENSION METROLOGY

(71) Applicant: KLA-Tencor Corporation, Milpitas, CA (US)

(72) Inventors: Mohammad Mehdi Daneshpanah, Foster City, CA (US); Abdurrahman Sezginer, Monte Sereno, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 74 days.

(21) Appl. No.: 14/032,309

(22) Filed: Sep. 20, 2013

(65) Prior Publication Data

US 2014/0086475 A1    Mar. 27, 2014

Related U.S. Application Data

(60) Provisional application No. 61/705,028, filed on Sep. 24, 2012.

(51) Int. Cl.
*G06K 9/00* (2006.01)
*G06T 7/00* (2006.01)

(52) U.S. Cl.
CPC ....... *G06T 7/001* (2013.01); *G06T 2207/10056* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 4,694,186 A * | 9/1987 | Onoda | G03F 9/70 250/205 |
| 5,884,984 A | 3/1999 | Arai et al. | |
| 6,643,017 B2 | 11/2003 | Cohen et al. | |
| 7,072,502 B2 | 7/2006 | Hemar et al. | |
| 7,123,356 B1 * | 10/2006 | Stokowski et al. | 356/237.2 |
| 7,155,689 B2 | 12/2006 | Pierrat et al. | |
| 7,398,508 B2 | 7/2008 | Shi et al. | |
| 7,684,049 B2 | 3/2010 | De Groot | |
| 8,248,617 B2 | 8/2012 | De Groot et al. | |
| 8,411,287 B2 | 4/2013 | Smilde et al. | |
| 8,730,474 B2 * | 5/2014 | Scheruebl | G03F 1/84 356/237.4 |
| 8,806,394 B2 * | 8/2014 | Feng | G03F 1/144 378/35 |
| 8,913,120 B2 * | 12/2014 | Poortinga | G03F 1/144 348/79 |
| 2004/0257568 A1 | 12/2004 | Yamane | |
| 2006/0000964 A1 * | 1/2006 | Ye et al. | 250/208.1 |
| 2006/0190850 A1 * | 8/2006 | Kohle | G03F 1/144 716/53 |
| 2006/0285124 A1 | 12/2006 | Hill | |

(Continued)

FOREIGN PATENT DOCUMENTS

| | | |
|---|---|---|
| DE | 102008002755 A1 | 8/2009 |
| DE | 102008002778 A1 | 9/2009 |

*Primary Examiner* — Soo Park
(74) *Attorney, Agent, or Firm* — Suiter Swantz pc llo

(57) ABSTRACT

A method and system for performing model-based registration and critical dimension measurement is disclosed. The method includes: utilizing an imaging device to obtain at least one optical image of a measurement site specified for a photomask; retrieving a design of photomask and utilizing a computer model of the imaging device to generate at least one simulated image of the measurement site; adjusting at least one parameter of the computer model to minimize dissimilarities between the simulated images and the optical images, wherein the parameters includes at least a pattern registration parameter or a critical dimension parameter; and reporting the pattern registration parameter or the critical dimension parameter of the computer model when dissimilarities between the simulated images and the optical images are minimized.

20 Claims, 4 Drawing Sheets

(56) References Cited

U.S. PATENT DOCUMENTS

| | | |
|---|---|---|
| 2007/0032896 A1* | 2/2007 | Ye et al. .................. 700/108 |
| 2007/0201044 A1 | 8/2007 | Yamane |
| 2007/0288219 A1 | 12/2007 | Zafar et al. |
| 2008/0205743 A1 | 8/2008 | Huang et al. |
| 2009/0319970 A1 | 12/2009 | Park |
| 2011/0016437 A1 | 1/2011 | Scherubl et al. |
| 2013/0019212 A1* | 1/2013 | Seidel .................. G03F 1/42 716/52 |
| 2013/0066597 A1 | 3/2013 | Van Beurden |
| 2014/0282303 A1* | 9/2014 | Feng .................. G06F 17/50 716/54 |

* cited by examiner

MODEL-BASED REGISTRATION AND CRITICAL DIMENSION METROLOGY

CROSS-REFERENCE TO RELATED APPLICATIONS

The present application claims the benefit under 35 U.S.C. §119(e) of U.S. Provisional Application Ser. No. 61/705,028, filed Sep. 24, 2012. Said U.S. Provisional Application Ser. No. 61/705,028 is hereby incorporated by reference in its entirety.

TECHNICAL FIELD

The disclosure generally relates to the field of metrology, particularly to registration and critical dimension metrology.

BACKGROUND

A mask (may also be referred to as a photomask or reticle) is a device that physically stores a pattern. The pattern is transferred to a wafer by lithography. Wafer includes a semiconductor wafer, an LCD or OLED display, or a magnetic storage medium. Lithography includes ultra violet (UV), deep ultra violet (DUV), extreme ultraviolet (EUV) lithography, electron or X-ray projection lithography, and nano imprint lithography (NIL). In UV and DUV lithography, the mask is a glass plate that is transmissively imaged on to the wafer with an optical lithography projector. In DUV the mask may be a binary mask (a pattern etched in a chromium film on a glass plate), an attenuated phase-shift mask (a pattern etched in a molybdenum silicide film on a glass plate), an alternating phase-shift mask (a first pattern etched into a chromium film on a glass plate and a second pattern etched into the glass substrate), or a chrome-less phase-shift mask (a pattern etched into a glass plate with no opaque material). In EUV lithography, the mask is reflectively imaged on to a wafer. The glass plate or a plate made of other low-thermal-expansion-coefficient material is coated with multiple layers of molybdenum and silicon to achieve high reflectivity. An absorber film such as tantalum-boron-nitride is coated over the multi-layer and a pattern is etched into the absorber film. In NIL, in particular step and flash imprint lithography (SFIL), a pattern is etched into a glass plate that is also referred to as a "template." In electron and X-ray projection lithography, the mask comprises an opaque stencil, which is a thin film such as nickel with a pattern etched through the film.

The patterning and mask technologies described above are given as background examples. They should not be construed to limit this invention to a particular patterning technology. Each wafer usually has many patterned layers, and a separate mask is used to pattern each layer. A mask set for all layers is used to manufacture many wafers. The layers of an advanced semiconductor device need to overlay with a very tight tolerance, on the order of few nanometers (nm). One of the contributors to wafer overlay is mask registration. Features defined on a mask may be slightly displaced from their ideal locations during fabrication. Such displacements are called registration error or registration for short. Registration of each mask manufactured is measured by a mask registration metrology system. If registration does not meet specifications, the mask is discarded and the mask writing equipment and process may be adjusted to ensure that pattern placement is accurate and repeatable. Traditionally, metrology targets are used to measure registration. Metrology targets are patterns that are specific to metrology and they are not part of the circuit that is formed on the semiconductor wafer. Metrology targets are inserted in the mask layout with a clear area surrounding each target.

SUMMARY

The present disclosure is directed to a method for performing model-based measurement. The method includes: utilizing an imaging device to obtain at least one optical image of a measurement site specified for a photomask; retrieving a design of photomask from a mask design database; selecting a portion of the design corresponding to the specified measurement site; utilizing a computing device implemented model of the imaging device to generate at least one simulated image of the selected portion of the design; adjusting at least one parameter of the computing device implemented model to minimize dissimilarity between said at least one simulated image and said at least one optical image, wherein said at least one parameter includes at least one of: a pattern registration parameter or a critical dimension parameter; and reporting said at least one of the pattern registration parameter or the critical dimension parameter of the computing device implemented model when the dissimilarity between said at least one simulated image and said at least one optical image is minimized.

A further embodiment of the present disclosure is also directed to a method for performing model-based measurement. The method includes: utilizing an imaging device to obtain a through-focus image stack of a measurement site specified for a photomask, the through-focus image stack including a plurality of optical images for the measurement site obtained at different focus settings; retrieving a design of photomask from a mask design database; selecting a portion of the design corresponding to the specified measurement site; utilizing a computing device implemented model of the imaging device to generate a plurality of simulated images of the selected portion of the design, the plurality of simulated images being generated for different focus settings, and each of the plurality of simulated images corresponding to one of the plurality of optical images; adjusting at least one parameter of the computing device implemented model to minimize dissimilarity between the plurality of simulated images and the plurality of optical images, wherein said at least one parameter includes at least one of: a pattern registration parameter or a critical dimension parameter; and reporting said at least one of the pattern registration parameter or the critical dimension parameter of the computing device implemented model when the dissimilarity between the plurality of simulated images and the plurality of optical images is minimized.

Furthermore, the present disclosure is directed to a metrology system. The metrology system includes an imaging device configured for obtaining a through-focus image stack of a measurement site specified for a photomask, wherein the through-focus image stack may include a plurality of optical images for the measurement site obtained at different focus settings. The metrology system also includes a processor. The processor is configured for: retrieving a design of photomask from a mask design database; selecting a portion of the design corresponding to the specified measurement site; utilizing a computing device implemented model of the imaging device to generate a plurality of simulated images of the selected portion of the design, the plurality of simulated images being generated for different focus settings, and each of the plurality of simulated images corresponding to one of the plurality of optical images; adjusting at least one parameter of the computing device implemented model to minimize dissimilarity between the plurality of simulated images and the plurality of optical images, wherein said at least one parameter includes at least one of: a pattern registration parameter or a critical dimension parameter; and reporting said at least one of the pattern registration parameter or the critical dimension parameter of the computing device implemented model when the dissimilarity between the plurality of simulated images and the plurality of optical images is minimized.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

There are several limitations associated with traditional target-based registration. For example, there can be a registration difference between functional device patterns and registration target, rendering inaccurate measurement results. In addition, only a limited number of targets can be included on any mask, therefore limiting the mask coverage. Furthermore, target-based registration is unable to effectively measure high spatial frequency component of a registration map because dense targets required, which consume reticle space inside the active area and potentially interfere with device function. Also, since targets are required to be placed in the design before mask manufacturing, hot spots identified by overlay tools cannot be monitored properly, and not all mask types and pattern sizes are measurable with current techniques.

The present disclosure is directed to methods and systems to enable model-based registration and critical dimension (CD) metrology based on functional device patterns rather than pre-defined metrology targets. For illustrative purposes, a method and system configured for carrying out a model-based registration process is described in detail. It is contemplated that similar methodology is applicable to both registration measurement and CD measurement.

Figure 1:
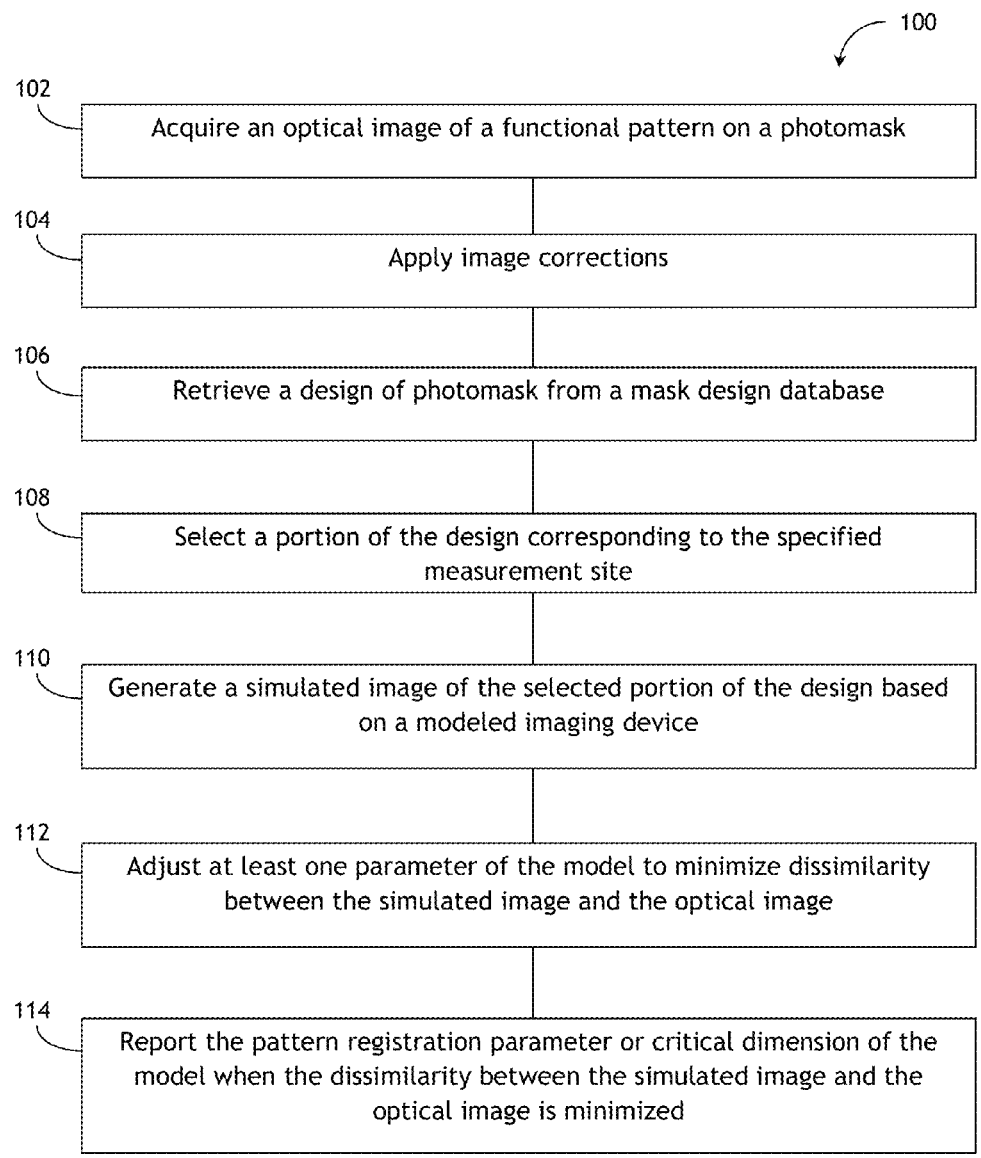
FIG. 1 is a flow diagram illustrating a model-based registration method.
Figure 2:
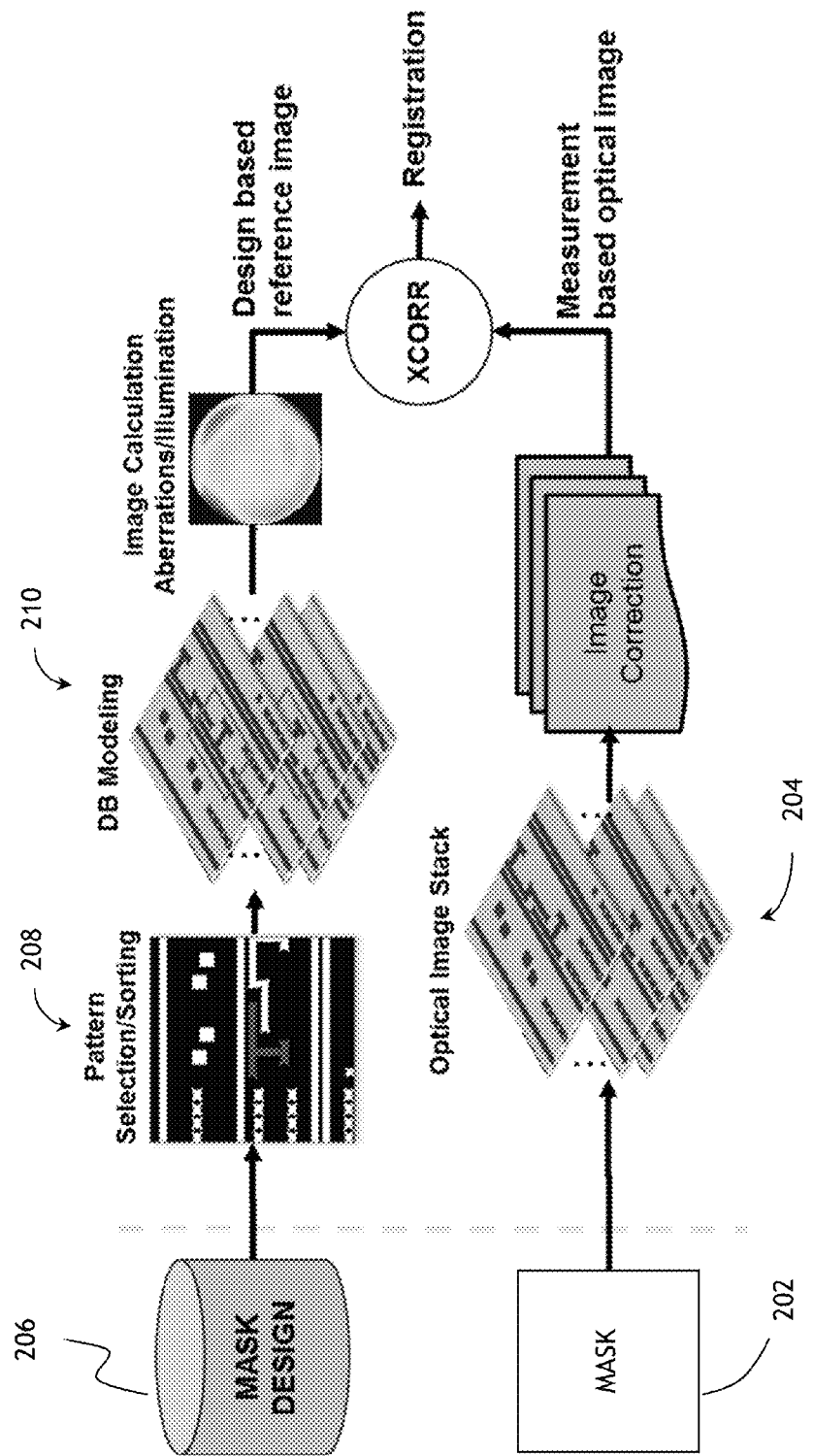
FIG. 2 is a block diagram illustrating the model-based registration depicted in FIG. 1.

Referring generally to FIGS. 1 and 2. FIG. 1 is a flow diagram illustrating a method 100 for carrying out a model-based registration process in accordance with one embodiment of the present disclosure, and FIG. 2 is a block diagram illustrating the model-based registration process.

As illustrated in the figures, step 102 may first acquire an optical image of a functional pattern on a photomask 202. For instance, one or more user-selected measurement site may specify which portion(s) of the mask 202 optical image(s) need to be obtained. Additionally and/or alternatively, a site selection algorithm may search a database for suitable patterns for which measurement uncertainty is small and sort/suggest/select one or more measurement sites for the user. It is contemplated that while the term "measurement site" used above may refer to a portion of the mask 202, step 102 may be configured to acquire the optical image of the entire mask 202 without departing from the spirit and scope of the present disclosure.

The optical image obtained in step 102 for a particular measurement site is shown as element 204 in FIG. 2. It is noted that element 204 indicates multiple optical images for the same measurement site (at different focus settings) may be obtained, and these optical images may be jointly referred to as an optical image stack. The various embodiments wherein multiple optical images are obtained will be described later in the present disclosure. For illustrative purposes now, an embodiment that obtains one optical image for one measurement site is described first.

Once the optical image for the measurement site is obtained, step 104 may apply image corrections to correct for image sensor (e.g., charge-coupled device or CCD) nonlinear response as well as field distortion and the like. The resulting optical image (after applying image corrections) will be used as the measurement based optical image, which is compared to a reference image for registration measurement. More specifically, the reference image is a computer-generated simulation image that represents how the functional patterns in a measurement site are expected to look like. Various parameters (including pattern registration) are utilized to generate the simulated image, and these parameters (including pattern registration) are adjusted so that the dissimilarity between the simulated image and the measured optical image is minimized. It is contemplated that the various parameters may be adjusted repeatedly and/or iteratively if necessary to minimize the dissimilarity between the simulated image and the measured optical image. The registration parameter utilized to generate the simulated image that best matches the measured optical image (i.e., with minimal dissimilarity) is considered as the pattern registration.

It is contemplated that the reference image for a particular optical image may be generated utilizing various techniques. In accordance with embodiments of the present disclosure, a design based reference image is generated for each optical image obtained. More specifically, designs of various photomasks are known and may be recorded in a mask design database 206. Based on the particular photomask that is being measured, i.e., mask 202 in this example, the corresponding design of this particular mask 202 may be retrieved from the mask design database 206 in step 106. Furthermore, the specific measurement site where optical image is taken is also known, allowing a specific portion of the mask design that corresponds to the specific measurement site to be selected in step 108 and used to generate the design based reference image.

Figure 3:
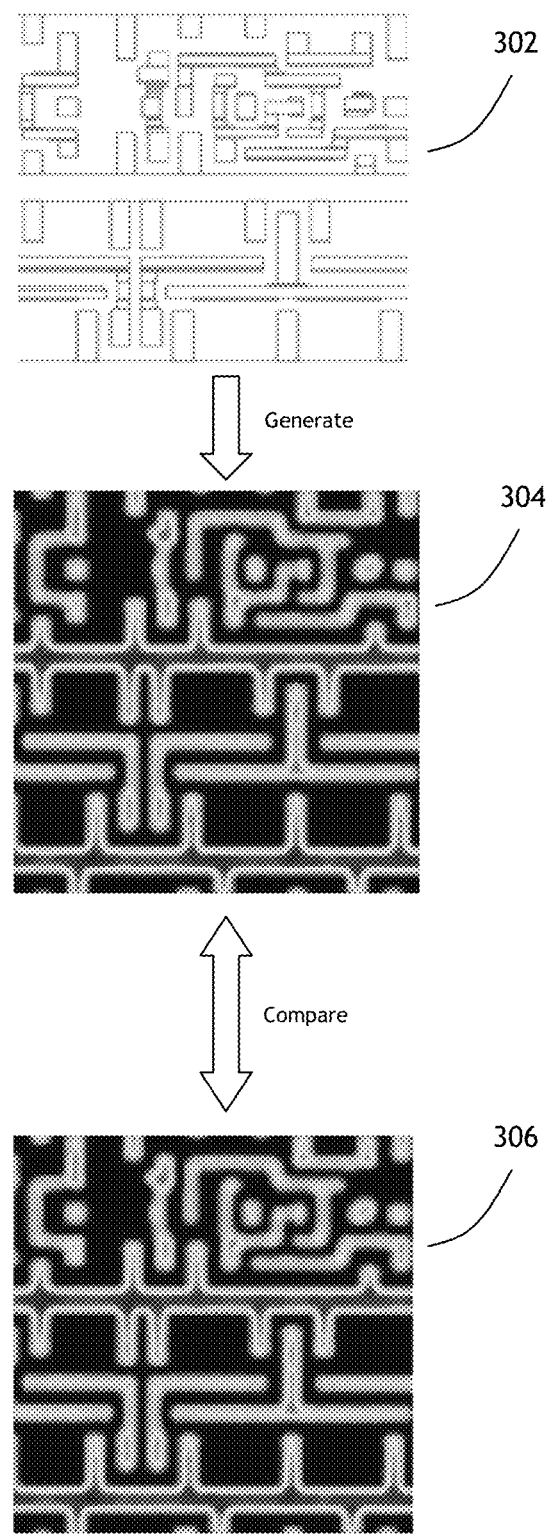
FIG. 3 is an illustration depicting generation of a simulated image.

Step 110 generates the simulated image 210 based on a model of the imaging system, the model of the photomask, and the specific portion of the mask design retrieved in step 108. More specifically, referring to an exemplary depiction shown in FIG. 3, a portion of the mask design 302 corresponding to a measurement site (of which the optical image is taken) is retrieved from the database. By knowing the design of the mask and also knowing the properties and behaviors of the imaging system utilized to acquire the optical image in step 102, an image 304 can be rendered to approximate how the portion of the mask is expected to look like when its image is acquired through the imaging system. This rendered image is referred to as the simulated image 304.

It is contemplated that the portion of the mask design corresponding to the measurement site may be extracted with an additional margin to allow for calculating optical proximity effects. It is also contemplated that instead of applying image correction techniques to correct the optical image in step 104, distortions and nonlinear sensor response may be applied to the simulated image as an alternative in step 104. That is, an optical image obtained without image correction may be compared against a simulated image with distortions and nonlinear sensor response applied in this alternative embodiment without departing from the spirit and scope of the present disclosure.

As mentioned above, the model utilized to generate the simulated image is controlled by various parameters, which are adjusted in step 112 so that the dissimilarity between the simulated image 304 and the measured optical image 306 is minimized (i.e., similarity is maximized). Such parameters may include, but are not limited to, mask process parameters, mask near-field parameters, focus, certain aberrations in the optical system, light intensity, wavelength, pixel size, registration (e.g., x shift and y shift) and the like. It is contemplated that some of these parameters may have pre-assumed and/or pre-calculated starting values and may be adjusted based on the optical image itself. There may also be some parameters that are fixed based on the knowledge of the imaging system. For instance, wavelength, pixel size, or parameters that can correlate with image shift (including telecentricity, pupil illumination asymmetry or the like) may be measured a priori and remain fixed.

In accordance with embodiments of the present disclosure, the registration parameter may be adjusted in at least two ways: 1) to consider all the features in the pattern to have the same registration, or 2) allow for the registration of each feature in the pattern to be adjusted independently. While the complexity of these two approaches are different, whether to implement the first or the second approach may be determined based on various factors such as the computation time requirement, computational resources, desired accuracy or the like. It is understood that either approach may be utilized without departing from the spirit and scope of the present disclosure.

It is contemplated that a metric may be defined to quantify the dissimilarity (or similarity) between the simulated image 304 and the measured optical image 306. In one example, a metric of dissimilarity of two images may be defined as the L-2 norm of pixel-by-pixel differences of two images. In another example, a metric of similarity of two images may be defined as their cross-correlation or the like. It is understood that the dissimilarity metric and/or the similarity metric may be defined differently from the exemplary definitions above without departing from the spirit and scope of the present disclosure.

Upon termination of step 112, i.e., the simulated image 304 now best matches the measured optical image 306, the registration at which this best-match is achieved is considered the pattern registration. Note that there are several other parameters that are adjusted during the iterative process, and they may be discarded or used to compensate for tool-induced-shift in the pattern image. In one embodiment, only the registration parameter that is utilized to generate the simulated image that best matches the measured optical image is eventually reported as the output of this model-based registration process in step 114.

Referring now to FIG. 2. As previously mentioned, element 204 indicates that multiple optical images for the same measurement site may be obtained at different focus settings in certain embodiments in accordance with the present disclosure. These optical images are jointly referred to as a through-focus image stack. For example, an initial focus offset, a focus range and a focus step may be defined, and the through-focus image stack may be acquired starting with the initial focus offset and repeatedly applying the offset step a predetermined number of times to sweep the focus range and acquire the predetermined number of images for the stack. In one embodiment, the offset range is between 100 and 600 nm. Alternatively, the focus range value may be defined by the depth of field (DOF) and can be between 1 and 4 DOFs.

In another example, an initial focus offset and a final focus offset may be defined, and the through-focus image stack may be acquired by varying the focus within the range defined by the initial focus offset and the final focus offset without being limited to any particular focus steps. It is contemplated that various other techniques may also be utilized to acquire the through-focus image stack for the same measurement site at different focus settings without departing from the spirit and scope of the present disclosure.

Utilizing multiple optical images for the same measurement site obtained at different focus settings reduces tool-induced shift that is different (and unwanted) from the actual registration shift. For instance, an optical image may be distorted and such a distortion may be hard to correct even using the available image correction techniques. A through-focus stack containing optical images obtained at different focus settings effectively reduces the tool-induced shift and model error, improving registration measurement accuracy.

In certain embodiments where through-focus stacks are acquired, a simulated image is generated for each optically obtained image in the stack. The process utilized for generating each simulated image is the same as the simulation technique described above, and the difference of the optical and simulated image is computed for each pixel and each focus setting. Similarly, the simulated image stack is adjusted to find the best match with the optical images, and the registration parameter utilized to generate the simulated image that best matches the optical image (i.e., with minimal dissimilarity) is reported as the pattern registration. Alternatively, instead of generating one simulated image for each optically obtained image in the stack, the optically obtained images may be binned into several (e.g., 20) bins. Each bin then contains one averaged optical image. Simulated images may then be computed for each bin, therefore reducing computationally complexity. It is contemplated that other techniques may also be utilized to reduce computationally complexity without departing from the spirit and scope of the present disclosure.

Also as mentioned above, various parameters may be adjusted when using the model of the imaging system to generate the simulated image(s). Such parameters may include aberrations in the optical system (e.g., may be measured offline and included in the model). However, it is contemplated that in certain embodiments where a low aberration objective is used, aberrations may be ignored in the model. Furthermore, in another embodiment, aberrations can be ignored in the model, and optical images can be acquired at two orientations of the mask. The two orientations may differ by 180 degrees rotation in the plane of the mask. Combining either the optical images or measured registration significantly reduces the effect of aberrations on registration measurements.

While the examples above depicted model-based registration measurement processes for one measurement site, it is understood that similar processes may be carried out independently for multiple measurement sites without departing from the spirit and scope of the present disclosure. It is contemplated that in one embodiment, the registration measurement for each site is simultaneously computed.

Furthermore, in addition to adjusting the focus to obtain the image stacks as described above, it is contemplated that any characteristics of the imaging device can be changed, including illumination aperture, imaging aperture, polarization or the like. The model can be designed in such a way to model such characteristics changes accordingly without departing from the spirit and scope of the present disclosure.

It is also contemplated that the methods and systems in accordance with the present disclosure also enable model-based critical dimension (CD) metrology. The CD of features on the mask can be measured in a similar manner as that of registration. As in the case described above, optical images are acquired either at a single focus, or through-focus. The simulated images are then produced to match the optical images either with pixel-by-pixel difference or by the cross-correlation metric. The model, however, allows the CD of the simulated images to change. The change in CD can be global (over the entire pattern) or local (varying over the pattern). Other parameters, like registration and focus may also be adjusted to achieve the best match between optical and simulated images. The CD at which the optical and simulated images are most similar is reported as the measured CD of the pattern that may differ from design CD. Note that in this case, auxiliary adjustable parameters can be used to compensate for tool-induced imaging effects.

Figure 4:
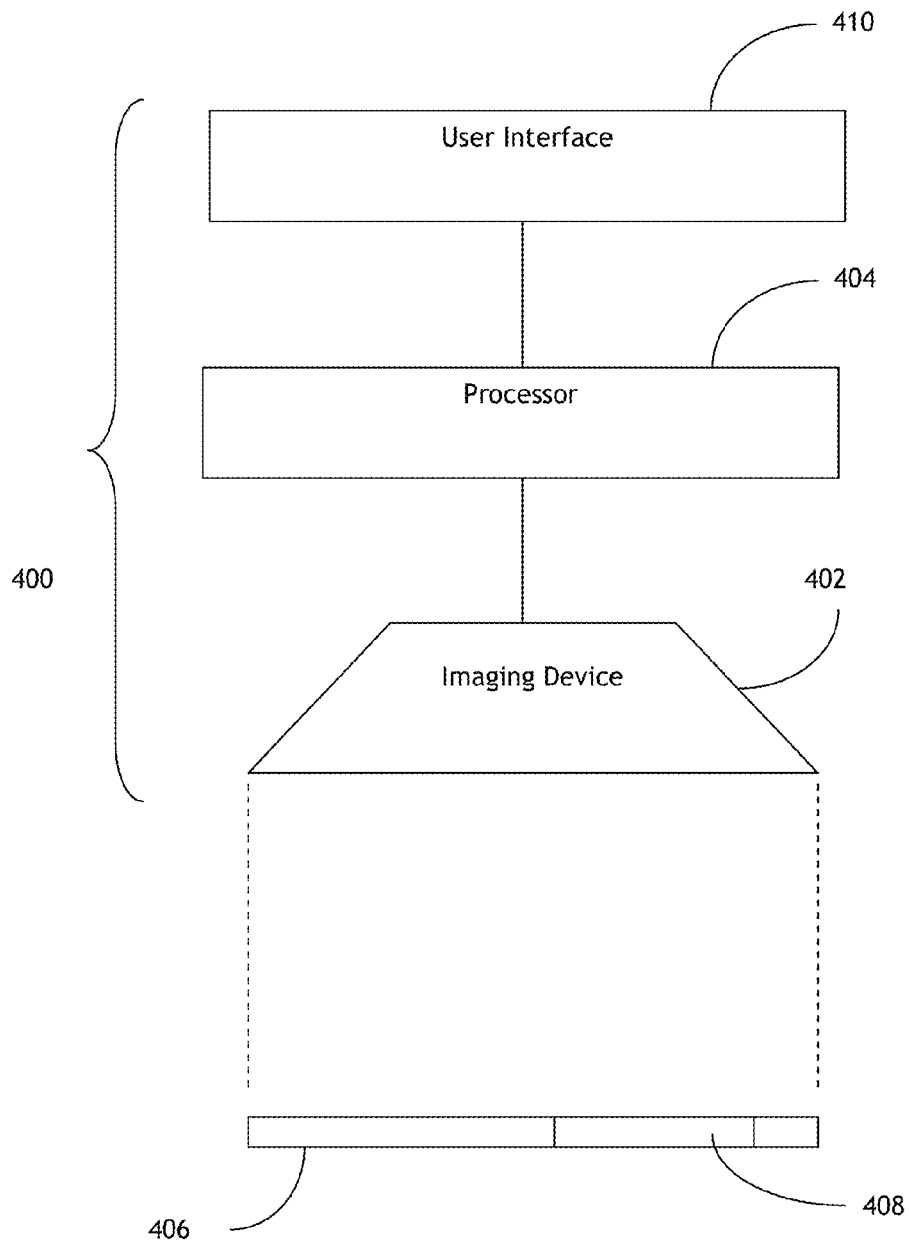
FIG. 4 is a block diagram illustrating a metrology system for performing the model-based registration in accordance with the present disclosure.

Referring now to FIG. 4, a block diagram depicting a metrology system 400 capable of performing the various measurement processes described above is shown. The metrology system 400 may include one or more imaging devices (e.g., scanners, microscopes or the like) 402 configured for obtaining images of a photomask 406. For instance, the imaging device 402 may capture an aerial image (e.g., top views) of the photomask 406 (or a particular measurement site 408 of the photomask) and provide the image to a processor 404 configured for processing the obtained image.

It is contemplated that the imaging device 402 can also operate in scanning mode, where measurement sites may or may not be known at the time of image measurement. In a scanning system, a greater number of measurement sites can be utilized to provide a better mask coverage. The scanning system can be designed to capture images at a single focus plane, or to be designed in such a way that a plurality of focus planes be captured simultaneously. It is also contemplated that certain metrology systems may provide the abilities to capture both sides of the photomask simultaneously without departing from the spirit and scope of the present disclosure.

The processor 404 may be implemented utilizing any standalone or embedded computing device (e.g., a computer, a processing unit/circuitry or the like). Upon receiving the image from the imaging device 402, the processor 404 may carry out the various measurement processes described above.

It is contemplated that a user interface (e.g., a control panel, a keyboard, a monitor screen or the like) 410 may be provided to receive user input. For instance, user-selected measurement sites may be provided via the user interface 410. Such user-selected measurement sites specify which portion(s) of the mask 406 optical image(s) need to be obtained. In addition, a user may also control the sample spacing, choice of using similar or non-similar in-die patterns, and as well as standard targets if provided.

It is also contemplated that the system may perform several calibration procedures. For instance, the imaging device (e.g., image sensor or CCD) response and field uniformity may need to be normalized through conventional techniques. In addition, field distortion may need to be measured through focus to account for aperture misalignment as well as magnification and/or telecentricity error. Furthermore, aberrations of the optical system may need to be measured in-situ and accounted for in certain embodiments as described above. For example, for the purpose of registration, only even aberrations are adjustable, while odd aberrations have to be measured in-situ and fixed during image computation. For CD measurements, this is reversed. It is understood that other calibration procedures may be carried out without departing from the spirit and scope of the present disclosure.

The methods and systems in accordance with the present disclosure provide several advantages. They allow registration measurement to be performed based on functional device patterns in-die directly rather than using metrology targets as proxy and provide flexibility to the users to choose patterns in the dense area of the mask where placement of traditional targets is interferes with device functionality. Measurement accuracy is improved when multiple patterns are measured simultaneously on the mask. They also increase mask coverage in order to compute registration map at different length scales to better understand and control mask contribution to overlay budget.

It is to be understood that the present disclosure may be implemented in forms of a software/firmware package. Such a package may be a computer program product which employs a computer-readable storage medium/device including stored computer code which is used to program a computer to perform the disclosed function and process of the present disclosure. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. A model-based measurement method, comprising:
   searching a mask design database to identify a measurement site for a photomask, wherein the measurement site contains a pattern identified to be suitable for pattern registration measurement;
   obtaining at least one optical image of the measurement site specified for the photomask utilizing an imaging device;
   retrieving a design of photomask from the mask design database;

selecting a portion of the design corresponding to the specified measurement site;

generating at least one simulated image of the selected portion of the design based on a computing device implemented model of the imaging device;

adjusting at least one parameter of the computing device implemented model to minimize dissimilarity between said at least one simulated image and said at least one optical image, wherein said at least one parameter includes at least one pattern registration parameter indicative of a shift of the pattern on the photomask; and reporting said at least one pattern registration parameter of the computing device implemented model when the dissimilarity between said at least one simulated image and said at least one optical image is minimized.

2. The method of claim 1, wherein said at least one optical image includes a through-focus image stack comprising a plurality of optical images for the measurement site obtained at different imaging device settings.

3. The method of claim 2, wherein said at least one simulated image includes a plurality of simulated images generated for different focus settings, wherein each of the plurality of simulated images corresponding to one of the plurality of optical images.

4. The method of claim 3, wherein said at least one parameter of the computing device implemented model is adjusted to minimize overall dissimilarity between the plurality of simulated images and the plurality of optical images.

5. The method of claim 1, wherein said at least one pattern registration parameter includes at least one of an x-axis shift of the pattern and a y-axis shift of the pattern.

6. The method of claim 1, wherein the computing device implemented model is configured to keep measurable parameters of the imaging device fixed throughout the adjusting step.

7. The method of claim 1, wherein said at least one optical image includes two optical images obtained at two different orientations with respect to the photomask.

8. The method of claim 7, wherein the two different orientations differ by 180 degrees.

9. A model-based measurement method, comprising:

searching a mask design database to identify a measurement site for a photomask, wherein the measurement site contains a pattern identified to be suitable for pattern registration measurement;

obtaining a through-focus image stack of the measurement site specified for the photomask utilizing an imaging device, the through-focus image stack including a plurality of optical images for the measurement site obtained at different focus settings;

retrieving a design of photomask from the mask design database;

selecting a portion of the design corresponding to the specified measurement site;

generating a plurality of simulated images of the selected portion of the design based on a computing device implemented model of the imaging device, each of the plurality of simulated images corresponding to one of the plurality of optical images;

adjusting at least one parameter of the computing device implemented model to minimize dissimilarity between the plurality of simulated images and the plurality of optical images, wherein said at least one parameter includes at least one pattern registration parameter indicative of a shift of the pattern on the photomask; and reporting said at least one pattern registration parameter of the computing device implemented model when the dissimilarity between the plurality of simulated images and the plurality of optical images is minimized.

10. The method of claim 9, wherein said at least one pattern registration parameter includes at least one of an x-axis shift of the pattern and a y-axis shift of the pattern.

11. The method of claim 9, wherein the computing device implemented model is configured to keep measurable parameters of the imaging device fixed throughout the adjusting step.

12. The method of claim 9, wherein each of said plurality of optical images includes two optical images obtained at two different orientations with respect to the photomask.

13. The method of claim 12, wherein the two different orientations differ by 180 degrees.

14. The method of claim 9, further comprising:

applying an image correction process to each of said plurality of optical images.

15. A metrology system, comprising:

an imaging device; and a processor in communication with the imaging device, the processor configured for:

searching a mask design database to identify a measurement site for a photomask, wherein the measurement site contains a pattern identified to be suitable for pattern registration measurement;

obtaining at least one optical image of the measurement site specified for the photomask from the imaging device;

retrieving a design of photomask from the mask design database;

selecting a portion of the design corresponding to the specified measurement site;

generating at least one simulated image of the selected portion of the design based on a computing device implemented model of the imaging device;

adjusting at least one parameter of the computing device implemented model to minimize dissimilarity between said at least one simulated image and said at least one optical image, wherein said at least one parameter includes at least one pattern registration parameter indicative of a shift of the pattern on the photomask; and reporting said at least one pattern registration parameter of the computing device implemented model when the dissimilarity between said at least one simulated image and said at least one optical image is minimized.

16. The metrology system of claim 15, wherein said at least one pattern registration parameter includes at least one of an x-axis shift of the pattern and a y-axis shift of the pattern.

17. The metrology system of claim 15, wherein the computing device implemented model is configured to keep measurable parameters of the imaging device fixed throughout the adjusting step.

18. The metrology system of claim 15, wherein said at least one optical image includes two optical images obtained at two different orientations with respect to the photomask.

19. The metrology system of claim 18, wherein the two different orientations differ by 180 degrees.

20. The metrology system of claim 15, wherein the processor is further configured for:

applying an image correction process to each of said plurality of optical images.

* * * * *